US008943490B1

(12) United States Patent
Jain et al.

(10) Patent No.: US 8,943,490 B1
(45) Date of Patent: Jan. 27, 2015

(54) INTELLIGENT NON-STOP SOFTWARE UPGRADE

(71) Applicant: Juniper Networks, Inc., Sunnyvale, CA (US)

(72) Inventors: Amit Jain, San Jose, CA (US); Rajagopalan Sivaramakrishnan, Sunnyvale, CA (US); Abhiman Yashpala Karkera, Sunnyvale, CA (US); Siva Madasamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 130 days.

(21) Appl. No.: 13/631,752

(22) Filed: Sep. 28, 2012

(51) Int. Cl.
*G06F 9/45* (2006.01)
(52) U.S. Cl.
USPC .......................... 717/168; 717/170; 717/172
(58) Field of Classification Search
None
See application file for complete search history.

(56) References Cited

U.S. PATENT DOCUMENTS

| | | | | |
|---|---|---|---|---|
| 6,397,385 | B1 * | 5/2002 | Kravitz | 717/170 |
| 6,915,513 | B2 * | 7/2005 | Duesterwald et al. | 717/172 |
| 6,976,154 | B1 | 12/2005 | Dyckerhoff et al. | |
| 7,320,127 | B2 * | 1/2008 | Banks et al. | 717/168 |
| 7,334,227 | B2 * | 2/2008 | Kim et al. | 717/172 |
| 7,574,481 | B2 * | 8/2009 | Moore et al. | 717/170 |
| 7,743,372 | B2 * | 6/2010 | Armstrong et al. | 717/170 |
| 7,774,785 | B2 * | 8/2010 | Hartung et al. | 717/168 |
| 8,074,092 | B2 * | 12/2011 | Fung | 713/320 |
| 8,135,771 | B2 * | 3/2012 | Lai et al. | 709/202 |
| 8,155,124 | B2 * | 4/2012 | Lv et al. | 370/395.31 |
| 8,191,058 | B2 * | 5/2012 | Chai et al. | 717/168 |
| 8,296,754 | B2 * | 10/2012 | Fitch | 717/168 |
| 8,364,843 | B2 * | 1/2013 | Hanselmann | 709/242 |
| 8,402,453 | B2 * | 3/2013 | Gupta et al. | 717/172 |
| 8,402,454 | B2 * | 3/2013 | Wang et al. | 717/172 |
| 8,495,614 | B2 * | 7/2013 | Kurtakov | 717/170 |
| 8,499,060 | B2 * | 7/2013 | Narayanan et al. | 709/220 |
| 8,521,853 | B2 * | 8/2013 | Rathunde et al. | 717/172 |
| 8,752,116 | B2 * | 6/2014 | Heo et al. | 717/168 |
| 8,782,632 | B1 * | 7/2014 | Chigurapati et al. | 717/168 |
| 8,806,472 | B2 * | 8/2014 | Lynch et al. | 717/172 |

(Continued)

OTHER PUBLICATIONS

Wu, et al., "NetPilot: Automating Datacenter Network Failure Mitigation"; 2012 ACM; [retrieved on Sep. 12, 2014]; Retrieved from Internet <URL:http://dl.acm.org/citation.cfm?id=2377677>;pp. 419-430.*

(Continued)

*Primary Examiner* — Xi D Chen
(74) *Attorney, Agent, or Firm* — Shumaker & Sieffert, P.A.

(57) ABSTRACT

In general, techniques are described for performing a controlled non-stop software upgrade (NSSU) of a network device. In some examples, a method includes receiving, by a first network device included in a virtual network device, a non-stop software upgrade (NSSU) request. The first network device is communicatively coupled to each of a computing device and a second network device. The method includes, in response to receiving the NSSU request, forwarding to the second network device, network packets that are received at the first network device and destined to the computing device. The method also includes sending a message to the computing device that instructs the computing device to stop sending network packets to the first network device. The method includes updating one or more software components within the first network device, after sending the message to the computing device and based at least in part on the NSSU request.

26 Claims, 6 Drawing Sheets

(56) References Cited

U.S. PATENT DOCUMENTS

2003/0177209 A1* 9/2003 Kwok et al. .............. 717/172
2010/0042869 A1* 2/2010 Szabo et al. .............. 714/4
2011/0239208 A1* 9/2011 Jung et al. .............. 717/170

OTHER PUBLICATIONS

Shieh, et al., "NetQuery: A Knowledge Plane for Reasoning about Network Properties"; 2011 ACM; [retreived on Sep. 12, 2014]; Retrieved from Internet <URL:http://dl.acm.org/citation.cfm?id=2018436.2018469&coll=DL&dl=GUIDE&CFID=561897782&CFTOKEN=11008202>;pp. 278-289.*

Iannone, Reichmann In-Service Upgrade of an Amplified 130-km Metro CWDM Transmission System Using a Single LOA with 140-nm Bandwidth; 2003 OFC; [retreived on Sep. 12, 2014]; Retrieved from Internet <URL:http://ieeexplore.ieee.org/stamp/stamp.jsp?tp=&arnumber=1248402>; pp. 248-249.*

Davoudian, et al., "Ordering Upgrade Changes for Highly Available Component Based Systems" 2014 IEEE; [retreived on Sep. 12, 2014]; Retrieved from Internet <URL:http://ieeexplore.ieee.org/stamp/stamp.jsp?tp=&arnumber=6754619>; pp. 259-260.*

* cited by examiner

INTELLIGENT NON-STOP SOFTWARE UPGRADE

TECHNICAL FIELD

Techniques of this disclosure relate generally to computer networks, and more particularly to update techniques for network devices.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain network devices within the network, such as routers and switches, forward the packets within the network. Switches, for example, typically direct packets to neighboring devices based on layer-two (L2) forwarding information within each packet. As another example, routers contain routing engines that maintain layer-three (L3) routing information describing routes through the network. Some network device may support both L2 forwarding and L3 routing functions. In either case, each route is typically associated with a path between locations on the network. From the routing information, a routing engine of the network device generates forwarding information, which is used by the network device to relay packet flows through the network and, more particularly to relay the packet flows to next hops. In reference to forwarding a packet, a "next hop" from a network device typically refers to a neighboring device along a given route or link. Upon receiving an incoming packet, the network device examines information within the packet to identify the destination for the packet. Based on the destination, the network device forwards the packet in accordance with the forwarding information.

Periodically, network devices need to be updated. For example, software installed and running on the network devices may need to be either upgraded or replaced. A network device, however, may not be able to concurrently install a software update, maintain communication sessions with peer devices, and forward incoming packets. Therefore, in some examples, a network device may transition offline and stop forwarding network traffic in order for the update to be performed. In such examples, a network-connected device, such as a server and/or other router, that is communicatively coupled to the offline network device may, at best, subsequently detect that network packets sent by the network-connected device are no longer being forwarded or otherwise processed by the offline network device. In such cases, the network-connected device may determine one or more alternative routes through the network to avoid the offline network device as the offline network device processes the software update. Subsequent to the network device going offline but prior to the network-connected device identifying an alternative network route, network packets sent by the network-connected device to the offline network device may be dropped. Once a network-connected device determines the alternative route, the network-connected device then re-sends the previously dropped network packets using the alternative route.

In large networks, each network-connected device that is coupled to the offline network device may determine one or more alternative routes to avoid the offline network device. In such examples, substantial quantities of network packets may be dropped and re-sent when a network device is taken offline for a software update. Dropping and resending packets may result in intermittent loss of network connectivity and increased packet loss and latency.

SUMMARY

In general, techniques are described for performing a controlled non-stop software upgrade (NSSU) of a network device, such as switch or router, by preemptively notifying network-connected devices coupled to the network device of an impending upgrade. For example, rather than determining a posteriori that a switch or other device has been taken offline for a software upgrade, the network-connected devices receive notifications from the switch of an impending upgrade to the switch. Using the notifications, the network-connected devices can determine alternative network routes that bypass the switch before the network device stops forwarding network packets. In this way, preemptively sending notifications from the switch to the network-connected devices may substantially reduce the number of packets that are dropped by the switch and re-sent by the network-connected devices when determining alternative network routes to redirect network traffic. The techniques may be applied in a variety of network architectures, including arrangements where multiple virtual network devices operate within a common operating environment.

In one example, first and second switches are configured as a single virtual switch. That is, the two switches appear as a single switch to other network-connected devices in a network. A network-connected device such as a server may be communicatively-coupled to each of the first and second switches via separate physical communication links. When the first switch receives an NSSU request to update its configuration, the first switch begins forwarding network packets destined to the network-connected device to the second switch. The second switch may, in turn, forward the network packets to the network-connected device. The first switch continues to route network packets received from the network-connected device until the first switch sends a message to the network-connected device that instructs the computing device to stop sending network packets to the first switch.

Because the first switch has preemptively sent the network-connected device the message indicating that the first switch is going offline, the network-connected device can determine an alternative network route to the second switch and redirect outgoing network packets prior the first switch going offline for a software update. Once the first switch has sent the message to the network-connected device, the first switch stops receiving network packets from the network-connected device and may go offline for the upgrade. In this way, the network-connected device can avoid sending network packets to the offline first switch, which the offline first switch would otherwise have dropped if the network-connected device had not received the message instructing it to stop sending network packets to the first switch.

In one example, a method includes receiving, by a first network device included in a virtual network device, a non-stop software upgrade (NSSU) request. The first network device is communicatively coupled to each of a computing device and a second network device in the virtual network device. The method also includes, in response to receiving the NSSU request, forwarding, by the first network device and to the second network device, network packets that are received at the first network device and destined to the computing device. The method also includes sending, by the first network device, a message to the computing device that instructs the computing device to stop sending network packets to the first network device. The method also includes, after sending the message to the computing device, updating one or more software components within the first network device based at least in part on the NSSU request.

In one example, a network device includes an interface that receives a non-stop software upgrade (NSSU) request, wherein the network device is a first network device included in a virtual network device. The first network device is communicatively coupled to each of a computing device and a second network device in the virtual network device. The network device also includes a forwarding unit that, in response to receiving the NSSU request, forwards, by the first network device and to the second network device, network packets that are received at the first network device and destined to the computing device. The forwarding unit also sends, by the first network device, a message to the computing device that instructs the computing device to stop sending network packets to the first network device. The network device also includes an update module that, after sending the message to the computing device, updates one or more software components within the first network device based at least in part on the NSSU request.

In one example, a computer-readable medium includes instructions for causing a programmable processor of a network device to receive a non-stop software upgrade (NSSU) request. The network device is a first network device included in a virtual network device. The first network device is communicatively coupled to each of a computing device and a second network device in the virtual network device. The computer-readable medium also includes instructions for causing a programmable processor of a network device to forward, in response to receiving the NSSU request and to the second network device, network packets that are received at the first network device and destined to the computing device. The computer-readable medium also includes instructions for causing a programmable processor of a network device to send a message to the computing device that instructs the computing device to stop sending network packets to the first network device. The computer-readable medium also includes instructions for causing a programmable processor of a network device to update, after sending the message to the computing device, one or more software components within the first network device based at least in part on the NSSU request.

In one example, a data center includes a plurality of servers; and a virtual network device that includes a first network device and a second network device that each provide multi-homed access to the plurality of servers in accordance with a link aggregation protocol. The first network device includes a control unit that, in response to receiving a non-stop software upgrade (NSSU) request, redirects network packets to the second network device that are received at the first network device and destined to the plurality of computing devices, and sends messages to the plurality of computing devices using the link aggregation protocol to instruct each of the plurality of computing devices to stop sending network packets to the first network device. After sending the messages to the computing devices, the control unit updates one or more software components within the first network device based at least in part on the NSSU request.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
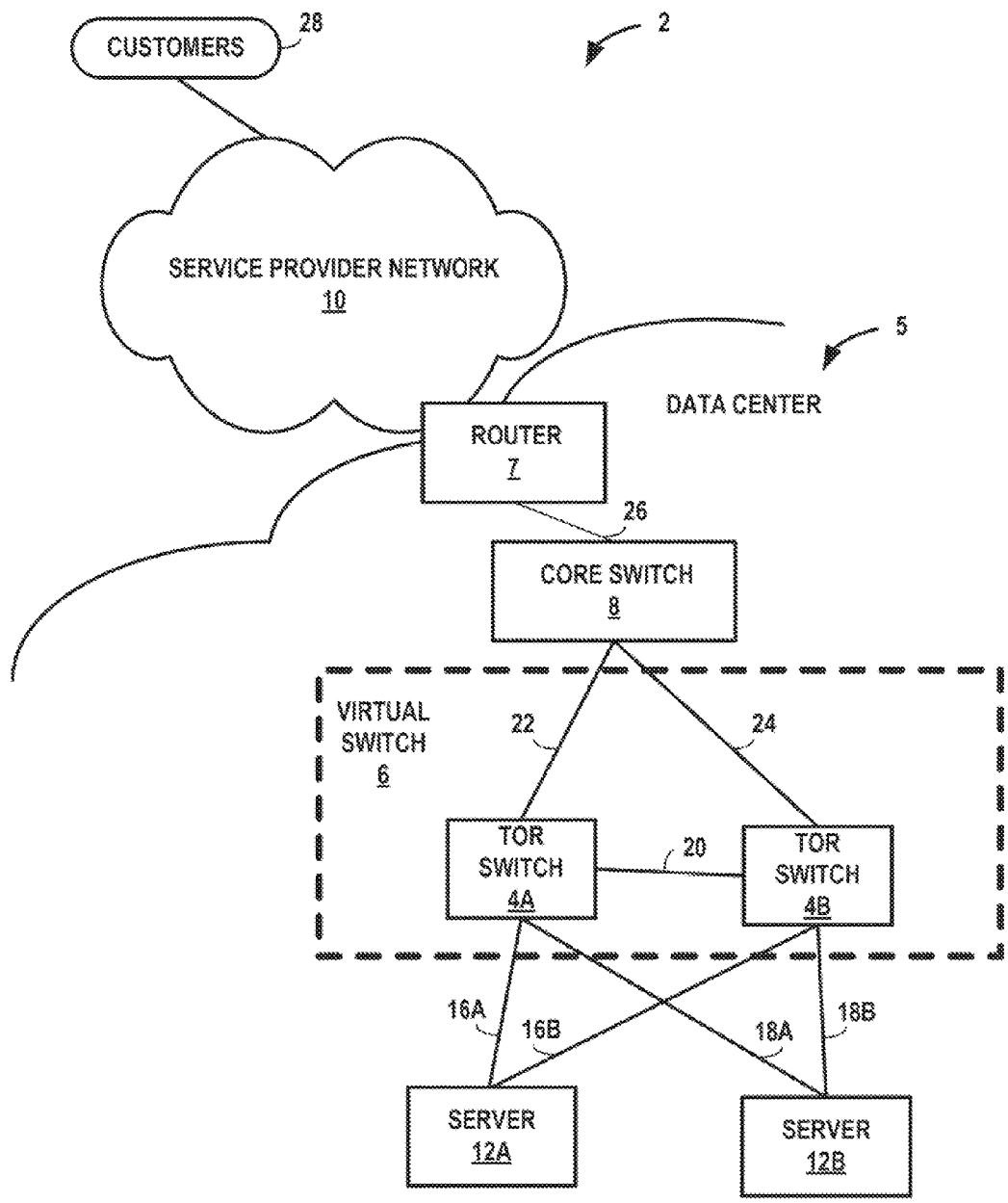
FIG. 1 is a block diagram illustrating an example system in which a Top-Of-Rack (TOR) switch performs a controlled Non-Stop Software Upgrade (NSSU), in accordance with the techniques described herein.

FIG. 1 is a block diagram illustrating an example system 2 in which Top-Of-Rack (TOR) switch 4B performs a controlled Non-Stop Software Upgrade (NSSU), in accordance with the techniques described herein. As used herein, the term Non-Stop Software Upgrade (NSSU) refers to a process in at least one network device of a set of redundant network devices continues to forward network traffic while which one or more software components of another one of the redundant network devices are upgrade.

In this example, TOR switches 4A-4B ("TOR switches 4") provide servers 12A-2B ("servers 12") included, in data center 5, with redundant (multi-homed) access to service provider network 10. In the illustrated embodiment, TOR switch 4A is coupled to server 12A via access links 16A-16B. TOR switch 4B is coupled to server 12B via access links 18A and 18B. TOR switches 4A and 4B are coupled via access link 12C. Core switch 8 aggregates connections of TOR switches 4 and is coupled to TOR switches 4A and 4B, respectively, via communication links 22 and 24. Core switch 8 is further coupled to router 7, which performs layer 3 routing to route network traffic between data center 5 and customers 28 using service provider network 10. In general, communication links 16, 18, 20, 22, and 24 may be wired or wireless communication links. For instance, one or more of communication links 16, 18, 20, 22, and 24 may be 100 Megabits/second (Mbps), 1 Gigabits/second (Gbps), or 10 Gbps Ethernet connections. In other examples, one or more of communication links 16, 18, 20, 22, and 24 may be 54 or 300 Mbps Wi-Fi wireless connections or 100 Mbps or 1 Gbps 4G wireless connections. Network packets forwarded between servers 12 and service provider network 10 may be forwarded by TOR switches 4, core switch 8, and router 7.

Data center 5 may include one or more computing devices, such as servers 12 and one or more network devices such as TOR switches 4. Computing devices 12 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of system 2 and data center 5 illustrated in FIG. 1 is merely exemplary.

Service provider network 10 may be coupled to one or more networks administered by other providers, and may thus form part of a large-scale public network infrastructure, e.g., the Internet. Service provider network 10 may provide data center 5 with access to the Internet, and may allow the servers within data center 5 to communicate with each other. Service provider network 10 may include a variety of network devices other than core switch 8. Although additional network devices are not shown for ease of explanation, it should be understood that system 2 may comprise additional network and/or servers such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of links 16, 18, 20, 22, and 24, such that the network elements of system 2 are not directly coupled.

Data center 5 is a facility that, in some examples, houses web sites and provides data serving and backup as well as other network-based services for subscribers. A data center in its most simple form may consist of a single facility that hosts all of the infrastructure equipment, such as networking and storage systems, redundant power supplies, and environmental controls. More sophisticated data centers are normally organizations spread throughout the world with subscriber support equipment located in various physical hosting facilities.

In some examples, data center 5 may represent one of many geographically distributed network data centers. As illustrated in the example of FIG. 1, data center 5 may be a facility that respectively includes servers 12A and 12B to provide a resource for one or more customers 28. Customers 28 may be collective entities such as enterprises and governments or individuals. For example, a network data center could house web servers for several small businesses. Other exemplary services may include data storage, virtual private networks, traffic engineering, file service, data mining, scientific- or super-computing, and so on. In some embodiments, data center 5 may be individual network servers, network peers, or otherwise.

In accordance with the techniques described herein, one or more of TOR switches 4, core switch 8, and servers 12 are configured to forward network packets using forwarding information of the respective devices. As further described in FIGS. 3 and 4, each of TOR switches 4 and core switch 8 may include a control unit and one or more packet forwarding engines (PFEs) (also referred to as "forwarding units"). The control unit and PFEs are described in further detail in FIGS. 2-4. The PFEs may be configured to switch packets from an input interface to an output interface of the switch using a switch fabric internal to the switch. For example, when TOR switch 4A receives packets, the ingress PFE performs a lookup using forwarding information and forwards the network packet across an internal switch fabric of TOR switch 4A to an egress PFE of the switch. The egress PFE then forwards the network packet to a "next hop" device, which may be another network device that is communicatively coupled to TOR switch 4A. In some examples, software and/or hardware that implement the control unit and PFEs may be updated using controlled Non-Stop Software Upgrade (NSSU) techniques of the present disclosure.

TOR switches 4A and 4B may be network devices that provide layer 2 (MAC address) and/or layer 3 (IP address) switching functionality. TOR switches 4 and core switch 8 may each include one or more processors and a memory, and that are capable of executing one or more software processes. Managed network devices receive network messages via one or more protocols such as, Simple Network Management Protocol (SNMP), Link Aggregation Control Protocol (LACP), etc. Upon receiving a network message, TOR switch 4A, e.g., may modify its current configuration based on configuration data in the network message. For example, configuration data may specify a request to perform a NSSU software update.

As shown in FIG. 1, resources of TOR switches 4A and 4B are configured as a virtual network device, i.e., virtual switch 6. Virtual network devices may include virtual switches, virtual routers, etc. One or more resources of TOR switches 4A and 4B are configured to appear as a single switch, i.e., virtual switch 6, to other network-connected devices, such as servers 12 and core switch 8. Virtual switch 6 is therefore associated with a unique layer 3 network address in some examples. Configurable resources of TOR switch 4A and 4B may include hardware and/or software resources of TOR switches 4A and 4B, such as line cards, ports, routing engines, etc. In the example of FIG. 1, TOR switch 4A includes a control unit (further described in FIGS. 3 and 4) that provides control plane functionality for TOR switch 4A. The control unit may support a virtualization protocol that TOR switches 4A and 4B utilize to configure and provision virtual switch 6.

In the example of FIG. 1, TOR switch 4A operates as a master controller for virtual switch 6. Using the virtualization protocol, TOR switch 4A sends messages to TOR switch 4B to configure resources of TOR switch 4B as a part of virtual switch 6. For example, TOR switch 4B may configure the forwarding plane of TOR switch 4B to forward traffic in accordance with the configuration specified in the message from TOR switch 4A. In this way, the logical locality of virtual switch 6 is independent of the physical locality of TOR switches 4A and 4B. Moreover, virtualization protocols may enable network administrators to aggregate and configure relatively inexpensive network devices as a single, virtual network device. In such examples, network administrators can increase or decrease network resource capacity by adding or removing physical resources from the configuration of virtual switch 6.

In some examples, upgrades may be applied to the control plane and/or forwarding plane functionality of TOR switches 4A and 4B to improve performance, usability, etc., of the switches. Non-stop software upgrades (NSSU) provide for rolling upgrades of switches, e.g., TOR switches 4A and 4B, which are communicatively coupled by one or more communication links. In the example of FIG. 1, NSSU techniques enable an individual switch, such as TOR switch 4B, to be taken offline and upgraded, while TOR switch 4A remains online to service network traffic from other network-connected devices, such as servers 12 and core switch 8. Once the upgrade to TOR switch 4B has completed, TOR switch 4B is brought back online and TOR switch 4A is taken offline and upgraded.

In accordance with techniques of the disclosure and as illustrated in FIG. 1, TOR switch 4B performs a controlled update when applying a NSSU software upgrade. That is, rather than TOR switch 4B immediately transitioning offline to perform a software upgrade without notifying other network-connected devices such as core switch 8 and servers 12, TOR switch 4B preemptively sends messages that indicate TOR switch 4B will be taken offline to one or more of the network-connected devices. In response to the receiving the messages, servers 12 and core switch 8 redirect network traffic to, e.g., TOR switch 4A, prior to TOR switch 4B transitioning offline. Consequently, techniques of the disclosure may reduce the number of packets that are dropped by the TOR switch 4B and that would otherwise need to be re-sent by core switch 8 and servers 12 during a NSSU software upgrade. In some examples, techniques of the disclosure may therefore reduce traffic loss and reaction time of servers 12 to determine TOR switch 4B is offline. Conventionally, the reaction time of servers 12 may be approximately 900 milliseconds or more without preemptive notification. Techniques of the disclosure may provide for a shorter reaction time (e.g., ~10 milliseconds) when servers 12 are preemptively notified by TOR switch 4B in accordance with techniques of the present disclosure.

Techniques are now illustrated in further detail with respect to the example system 2 of FIG. 1. Servers 12 are communicatively coupled to each of TOR switches 4 by a separate communication links and are therefore "multi-homed." That is, server 12B, for example, can send and receive network packets with TOR switches 4A and 4B, which appear collectively as a single, virtual switch 6, using either and/or both of communication links 18A and 18B.

Initially, TOR switch 4B receives a NSSU request to perform a software upgrade. In some examples, TOR switch 4B may receive the NSSU request as an indication of user input from an administrator via a user interface of TOR switch 4B. In other examples, TOR switch 4B receives the request from TOR switch 4A. In still other examples, TOR switch 4B receives the NSSU request from a network management system that provides for and manages rolling NSSU updates. In any case, responsive to receiving the request, TOR switch 4B changes its forwarding path for "downstream" network packets that are received from core switch 8 and destined to servers 12. Specifically, TOR switch 4B, begins forwarding these downstream network packets to TOR switch 4A using communication link 20. TOR switch 4A then forwards the network packets to servers 12.

In some examples, communication link 20 may operate as a virtual backplane of virtual switch 6. That is, communication link 20 may provide a virtual backplane connection between TOR switches 4A and 4B. In some examples, communication link 20 may be a 1 Gigabit, 10 Gigabit, or 64 Gigabit connection between TOR switches 4A and 4B.

In some examples, TOR switch 4B may also send a message to core switch 8 that TOR switch 4B will be taken offline. In response to receiving the message, core switch 8 determines an alternative network route that includes TOR switch 4A for network packets sent and received between servers 12 and service provider network 10. Upon determining the alternative network route, core switch 8 may stop forwarding network packets to TOR switch 4B.

In some examples, although TOR switch 4B redirects network traffic to TOR switch 4A, TOR switch 4B continues to forward "upstream" network packets to core switch 8 that are received at TOR switch 4B from servers 12 and destined for service provider network 10. In accordance with techniques of the disclosure, TOR switch 4B sends messages to each of servers 12A and 12B that indicate TOR switch 4B will be taken offline. In response to receiving the messages, servers 12 determine alternative network routes through TOR switch 4A and begin sending all upstream network packets using communication links 16A and 18A. Servers 12A and 12B therefore stop sending upstream network packets using communication links 16B and 18B to TOR switch 4B. In some examples, TOR switch 4B may also send a message to TOR switch 4A that indicates TOR switch 4B will be taken offline. In some examples, the messages that indicate TOR switch 4B will be taken offline may comprise LACP messages as further described in FIGS. 2-6. As further described in FIGS. 2-6, devices such as TOR switches 4 and servers 12 may use link aggregation to communicatively couple the respective devices in data center 5. Techniques of the disclosure may take advantage of a preexisting link aggregation protocol by using link aggregation messages to signal that TOR switch 4B, for example, is going to apply a software upgrade. While techniques of the disclosure are illustrated using LACP messages, the techniques are not limited to LACP and any other suitable protocols may be used.

TOR switch 4B may subsequently determine that upstream and downstream network packets are no longer being received at TOR switch 4B. In some examples, upon determining network packets are no longer being received over an elapsed time period, TOR switch 4B commences the NSSU software update process. In such examples, TOR switch 4B may go offline and therefore stop receiving network packets. In some examples, TOR switch 4B installs the NSSU software update by installing and configuring the control plane and/or forwarding plane in accordance with the software update. Once the TOR switch 4B has been updated, TOR switch 4B may come back online. TOR switch 4B, upon coming online, may again begin receiving and forwarding network packets.

In some examples, TOR switch 4B sends messages to one or more of TOR switch 4A, core switch 8, and servers 12 that indicate the respective devices may begin sending network packets to TOR switch 4B. TOR switch 4B begins receiving and forwarding network packets from the respective devices as before TOR switch 4B was taken offline for the NSSU software update. In some examples, TOR switch 4A may determine that TOR switch 4B has been updated. Consequently, TOR switch 4A may perform the controlled NSSU software update process as previously described with respect to TOR switch 4B. In this way, techniques of the disclosure enable TOR switches 4A and 4B to be separately upgraded on a rolling basis such that virtual switch 6 continues to service network traffic from core switch 8 and servers 12 with minimal service interruptions. Furthermore, although techniques of the disclosure are illustrated with respect to two servers, e.g., servers 12A and 12B, TOR switch 4B may apply techniques of the disclosure when any number of network devices and/or servers are coupled to TOR switch 4B. That is, TOR switch 4B may perform a controlled NSSU by preemptively notifying each device connected to TOR switch 4B, which enables the respective devices to a priori redirect network traffic using a different network route that does not include TOR switch 4B.

Although discussed for purposes of example primarily with respect to switches, the techniques of this disclosure may be implemented by other network devices as well. For example, routers may implement the techniques of this disclosure in some examples to improve Layer Three (L3) (that is, Network Layer) functionality of the routers. Although the techniques of this disclosure are described for purposes of example with respect to service provider network 10 and data center 5, the techniques may be similarly applied in devices associated with other contexts, such as non-edge routers and non-edge customer devices as well as L2, L3, and L2/L3 switches, among other devices, within service provider network 10 and data center 5.

Figure 2:
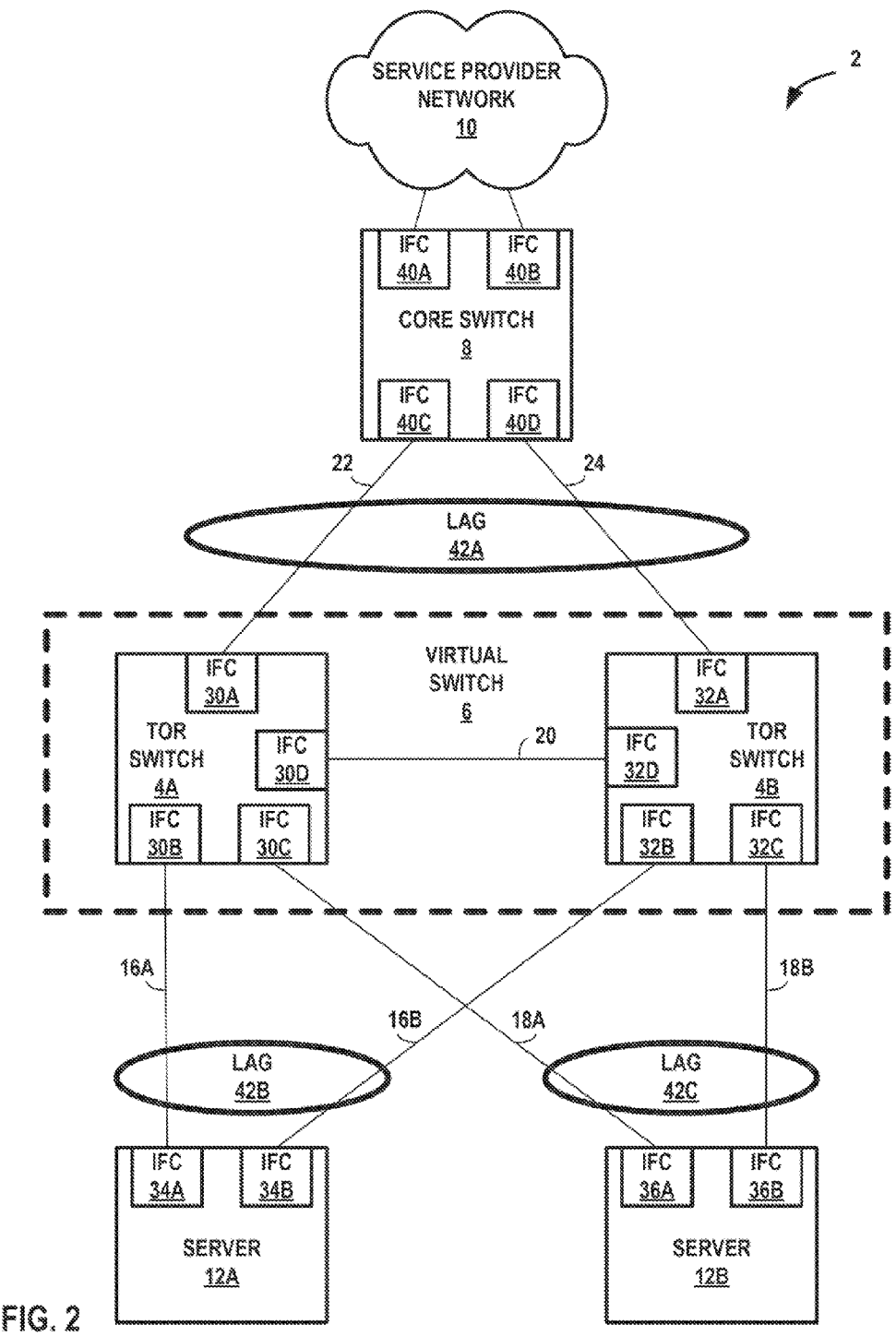
FIG. 2 is a block diagram illustrating further details of the example system of FIG. 1 in which a TOR switch performs a controlled NSSU, in accordance with the techniques described herein.

FIG. 2 is a block diagram illustrating further details of the example system 2 of FIG. 1 in which Top-Of-Rack (TOR) switch 4B performs a controlled Non-Stop Software Upgrade (NSSU), in accordance with the techniques described herein. As shown in FIG. 2, TOR switches 4A and 4B include, respectively, interfaces 30-30D ("IFCs 30") and interfaces 32A-32D ("IFCs 32"). Core switch 8 includes interfaces 40A-40D ("IFCs 40"). Servers 12A and 12B include, respectively, interfaces 34A-34B ("IFCs 34") and interfaces 36A-36B ("IFCs 36"). Each of the interfaces may be physical interfaces implemented as high-speed, on-chip memory within one or more forwarding integrated circuits.

Communication links may be physically coupled to interfaces to provide communicative couplings between the two interfaces. For example, communication link 16A may be a 1 Gigabit Ethernet cable that is coupled to IFC 34A and IFC 30B. In other examples, communication link 16A may be a wireless communication link between IFC 34A and IFC 30B. As shown in FIG. 2, each of core switch 6, TOR switches 4 and servers 12 are communicatively coupled by the respective communication links as previously described in FIG. 1.

In the example of FIG. 2, each of core switch 8, TOR switches 4, and servers 12 support link aggregation. Link aggregation provides techniques for combining multiple communication links to operate as a single, logical communication link. In some examples, the single, logical communication link has a single logical address. In other examples, each physical communication link included in the single, logical communication link has a unique address. In any case, a network device implementing link aggregation may send network packets in parallel across each of the multiple communication links to increase throughout and improve reliability of the network connection. Link Aggregation Control Protocol (LACP) is one example of link aggregation protocol that core switch 8, TOR switches 4, and servers 12 may use to perform link aggregation. In some examples, link aggregation techniques may be implemented in the layer 2 (data link layer) and/or layer 3 (network layer) network layers of the OSI model. In such examples, each device may include a link aggregation module to configure link aggregation.

In the example of FIG. 2, Link Aggregation Groups (LAG) 42A, 42B, and 42C are configured using communication links 16, 18, 22, and 24. As one example, LAG 42C is configured using communication links 18. For instance, an administrator configures TOR switches 4 and server 12B to include each of communication links 18A and 18B in LAG 42C. Network packets sent between TOR switches 4 and server 12B are distributed across communication links 18A and 18B. For instance, network traffic may be balanced across each of communication links 18A and 18B to provide the greatest possible throughout. In the event of a failed communication link in LAG 42C, server 12B, for example, may automatically send network packets using the remaining one or more operational communication links.

While an administrator may manually configure a LAG at a network-connected device, LACP also supports LACP packets to automatically provision and control LAGs. LACP packets may include information to add and/or remove interfaces, and therefore corresponding communication links, from a LAG. As one example, TOR switch 4B may send LACP packets to each of TOR switch 4A and server 12B to establish LAG 42C. Each of TOR switch 4A and server 12B configure IFCs 30C, 36A, 36B to include communication links 18 in LAG 42C. As described in FIG. 1, virtual switch 6 is configured to include resources of TOR switches 4A and 4B and appears as single, logical network device within the example system 2. Consequently, when server 12B sends network packets using a network route that includes virtual switch 6, server 12B may distribute the network packets across each of communication links 18A and 18B that are included in LAG 42C. Each of LAG 42A and LAG 42B may be similarly configured as described above with respect to LAG 42C.

Techniques of the present disclosure to perform a controlled NSSU are further described with respect FIG. 2. Initially, TOR switch 4B receives a message that includes a NSSU request from TOR switch 4A. Upon receiving the message, TOR switch 4B updates its forwarding path for downstream network packets that are received from core switch 8 and destined to servers 12. For instance, IFC 32A may be the ingress interface for downstream network packets received from core switch 8 and destined to servers 12. TOR switch 4B removes IFC 32B and IFC 32C from LAG 42B and 42C, respectively, such that IFC 32B and IFC 32C stop receiving and forwarding network packets from core switch 8 but continue receiving and forwarding upstream network packets from servers 12. In such examples, TOR switch 4B updates its forwarding path to remove IFC 32B and IFC 32C as egress interfaces for downstream network packets that are received at IFC 32A. Additionally, TOR switch 4B updates its forwarding path such that IFC 32D is the egress interface for downstream network packets received at IFC 32A. In this way, downstream network packets received at IFC 32A are seamlessly forwarded to IFC 32D as the next hop interface. IFC 32D sends the downstream network packets to IFC 30D using communication link 20. TOR switch 4A forwards the downstream network packets to server 12B via IFC 30C, which may be the egress interface for the downstream network packets.

TOR switch 4B, in accordance with techniques of the disclosure, sends LACP packets to each of servers 12A and 12B that instruct the respective servers to stop sending network packets to TOR switch 4B. The LACP packets include information to remove IFC 34B and IFC 36B from LAG 42B and LAG 42C, respectively. In one example, the information included in the LACP packet turns off a sync bit at each respective server. Conventionally, a sync bit at a server indicates whether an IFC (and therefore the communication link) associated with the sync bit is active, i.e., transmitting network packets in the LAG, or in standby, i.e., not transmitting network packets in the LAG. Because LACP implementations already include information in the LACP packet that represents the sync bit setting, techniques of the disclosure may use the sync bit setting in the LACP packet to instruct, e.g., servers 12 to stop sending upstream network packets to TOR switch 4B. By sending messages to each of servers 12 to remove IFC 34B and IFC 36B from LAG 42B and LAG 42C, respectively, servers 12A and 12B remove IFC 34B and IFC 36B from LAG 42B and LAG 42C. In this way, each of servers 12A and 12B stop sending network packets using communication links 16B and 18B.

In response to removing IFC 34B and IFC 36B from LAG 42B and LAG 42C, servers 12A and 12B determine that network packets may be sent and received using IFC 34A and IFC 36A that are included in LAG 42B and LAG 42C, respectively. Consequently, servers 12A and 12B can redirect upstream network packets to TOR switch 4A of virtual switch 6 using IFC 34A and IFC 36A. By redirecting network traffic in response to receiving the LACP messages from TOR switch 4B, servers 12 do not send upstream network packets to TOR switch 4B after it has gone offline. In this way, techniques of the disclosure reduce the number of packets that would have otherwise been dropped and re-sent if servers 12 discovered a posteriori that TOR switch 4B had been taken offline without preemptive notifications.

Once servers 12A and 12B have removed IFC 34B and 36B from LAG 24B and LAG 42C, respectively, TOR switch 4B may determine that upstream and downstream network packets are no longer received at TOR switch 4B. Consequently, TOR switch 4B applies the software update based on the NSSU request, which may include taking TOR switch 4B offline. In some examples, TOR switch 4B may reboot one or more times to apply the software update. In some examples, during the software update, TOR switch 4B may not process network packets, and therefore network packets sent to TOR switch 4B during the software update may be dropped by TOR switch 4B. Once the TOR switch 4B has been updated, TOR switch 4B may come back online. TOR switch 4B, upon coming online, may again begin reprocessing network packets.

In the example of FIG. 2, TOR switch 4A is the master controller for virtual switch 6 and TOR switch 4B is the backup control for virtual switch 6. Thus, if TOR switch 4A is taken offline in either a controlled or uncontrolled manner, TOR switch 4B operates as the master controller of virtual switch 6 until TOR switch 4A returns back online. In the example of FIG. 2, once TOR switch 4B has completed its software update, TOR switch 4A may perform a software update. To perform the software update, TOR switch 4A may perform the control NSSU software update process as previously described in FIG. 2 with respect to TOR switch 4B. In some examples, when TOR switch 4A sends a message to TOR switch 4B that TOR switch 4A will be taken offline, TOR switch 4B may begin operating as the master controller until the software update on TOR switch 4A has completed. In this way, TOR switch 4B may seamlessly transition to operating as the master controller without discovering a posteriori that TOR switch 4A has been taken offline and therefore preemptively respond to the impending removal of resources, i.e., TOR switch 4A, from virtual switch 6.

Figure 3:
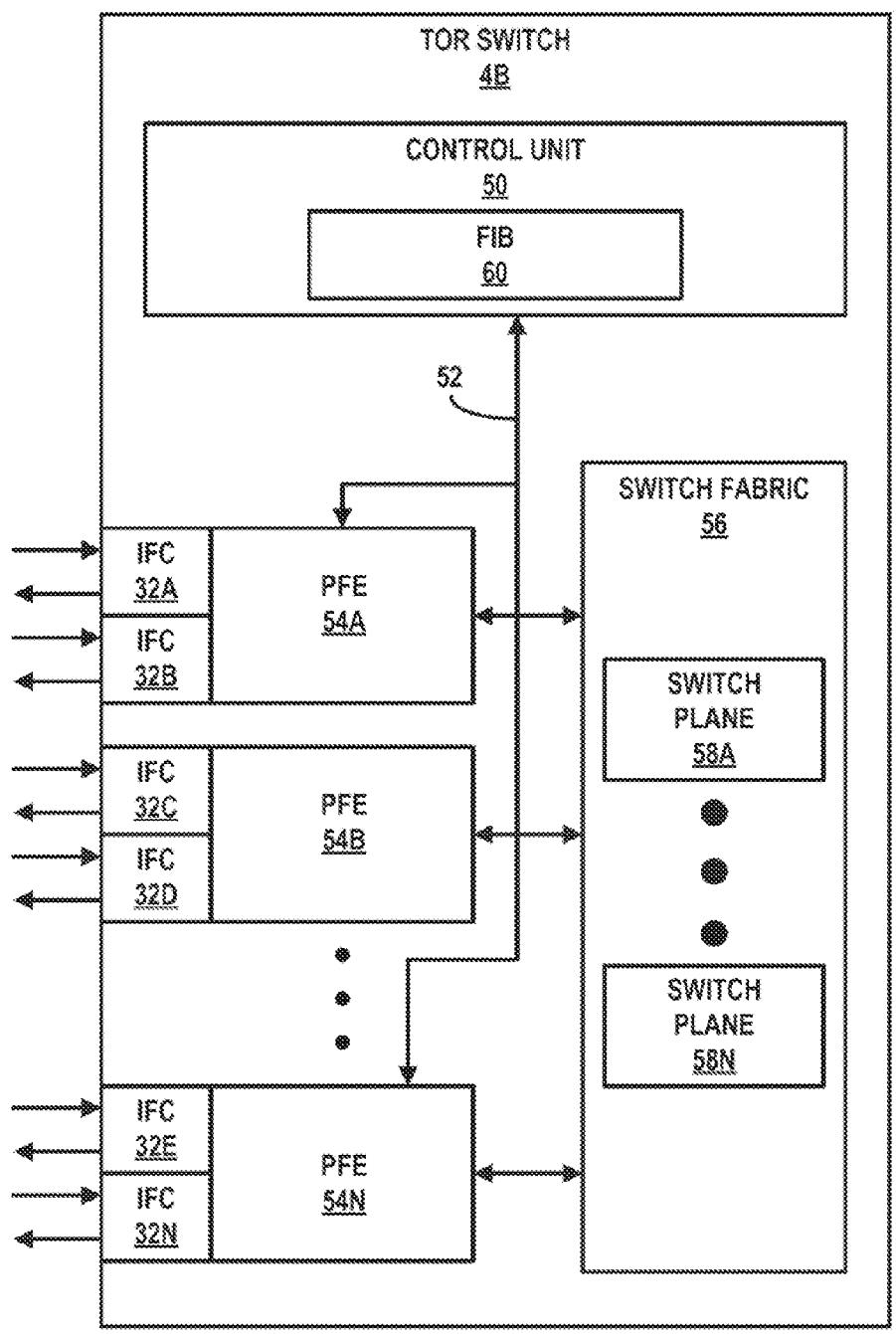
FIG. 3 is a block diagram illustrating the example TOR switch of FIGS. 1 and 2 in greater detail, in accordance with the techniques described herein.

FIG. 3 is a block diagram illustrating example TOR switch 4B of FIGS. 1 and 2 in greater detail, in accordance with the techniques described herein. TOR switch 4B includes PFEs 54A-54N ("PFEs 54") capable of implementing techniques of the disclosure and switch fabric 56. In this example, TOR switch 4B also includes a control unit 50. PFEs 54 may receive and send data via interfaces 32A-32N ("IFCs 32"). In other embodiments, each of PFEs 54 may comprise more or fewer IFCs. Switch fabric 56 provides an interconnect mechanism for forwarding data between PFEs 54 for transmission over a network, e.g., the Internet.

Control unit 50 maintains forwarding tables and controls user access to TOR switch 4B. In this example, control unit 50 is connected to each of PFEs 54 by a dedicated link 52, which may be an internal Ethernet link. For example, dedicated link 52 may comprise a 100 Mbps Ethernet connection. Control unit 50 may maintain a forwarding information base (FIB) 60 that includes forwarding information to forward network packets. In some examples, control unit 50 may maintain configuration information for various networking techniques, such as IP multicasting. Control unit 50 copies the FIB to each of PFEs 54. This allows the FIB in each of PFEs 54 to be updated without degrading packet forwarding performance of TOR switch 4B. Alternatively, control unit 50 may derive separate FIBs which are copied to respective PFEs 54. Control unit 50 is described in more detail with respect to FIG. 4.

In a switch, a "switch plane" is generally capable of providing a communication path between any two of PFEs 54. In this example, switch fabric 56 consists of multiple standalone switch planes 58A through 58N ("switch planes 58"). In some embodiments, each of switch planes 58 is provided by one or more switch fabric chips on one or more separate, removable switch cards. Other network devices, such as core switch 8 or a router, which implement the techniques described herein, may comprise additional or fewer switch planes, including a single switch plane. A majority of the switch planes may be active at any given time with data packets distributed over the active switch planes. Inactive switch planes of switch fabric 56 serve as back-up switch planes such that if one or more of the active switch planes goes offline, the back-up switch planes automatically activate, and the bandwidth capacity of TOR switch 4B is not diminished. The back-up switch planes may be identical to the active switch planes and act as hot spares to maintain bandwidth capacity in the event that one or more of the active switch planes fail. Each of switch planes 58 is operationally independent; therefore, standalone TOR switch 4B may continue to forward packets as long as at least one of switch planes 58 remain active, but possibly at a reduced bandwidth capacity.

As part of a standalone switch, switch planes 58 form a standalone switch fabric 56. That is, each of switch planes 58 is capable of providing a connection between any of PFEs 54 within TOR switch 4B. In this manner, switch planes 58 form a standalone switch fabric that enables packet forwarding between the plurality of PFEs 54 of TOR switch 4B. For example, switch fabric 56 may be provided by a set of removable switch cards, where each removable switch card provides a respective one of switch planes 58.

In the example of FIGS. 2 and 3, IFC 32A is the ingress interface for downstream network packets sent by core switch 8 to server 12B. Consequently, PFE 54A, in the example of FIG. 3, is the ingress PFE for the downstream network packets. In one example, PFE 54A receives a downstream network packet from core switch 8 that is destined to server 12B. PFE 54A may perform a lookup based on the layer 2 frame header of the downstream network packet. Based on forwarding information used to configure PFE 54A, PFE 54A forwards the downstream network packet to a PFE of TOR switch 4B that includes the egress interface for downstream network packets destined to server 12B. In the example of FIGS. 2 and 3, PFE 54B is the egress PFE for the downstream network packets and the egress interface for such downstream network packets is IFC 32C. PFE 54A, upon performing the lookup, forwards the downstream network packet to PFE 54B using switch fabric 56. PFE 54B, upon receiving the downstream network packet may forward the network packet to server 12B using IFC 32C.

In some examples, TOR switch 4B receives a request to perform a NSSU within the control plane of TOR switch 4B, e.g, control unit 50. In some examples, the NSSU may update the forwarding plane of TOR switch 4B, which includes PFEs 54 and switch fabric 56. In response to receiving the NSSU request, control unit 50 identifies egress interfaces, such as IFC 32B and 32C that forward downstream network packets from core switch 8. Upon identifying IFC 32B and 32C, control unit 50 removes each of IFC 32B and 32C from LAG 42B and LAG 42C membership, such that IFC 32B and 32C are not used as egress interfaces by TOR switch 4B to forward downstream network packets to servers 12. IFC 32B and 32C may continue to operate as ingress interfaces for upstream network packets received from servers 12 and destined for service provider network 10.

Control unit 50 further updates forwarding information in PFEs 54 such that IFC 32D operates as the updated egress interface for forwarding downstream network packets from core switch 8 to TOR switch 4A. Consequently, when IFC 32A of PFE 54A receives a downstream network packet destined for server 12B, PFE 54A forwards the network packet to PFE 54B, which in turn forwards the network packet to TOR switch 4A using IFC 32D. In this way, downstream network packets are redirected to TOR switch 4A in response to receiving the software update.

Control unit 50 also generates messages that TOR switch 4B sends to servers 12 that instructive the respective servers to stop sending upstream network packets to TOR switch 4B that are destined to service provider network 10. That is, control unit 50 generates a LACP packet that instructs each of servers 12 to remove communication links 16B and 18B from the memberships of LAG 42B and LAG 42C. Specifically, the LACP packet includes a sync bit setting that, when processed by each of servers 12, causes the respective servers to place communication links 16B and 18B in standby, i.e., not used to send/receive network packets in the respective LAGs. When servers 12 receive the LACP packets, the servers remove links 16B and 18B from LAG 42B and 42C, respectively. Consequently, servers 12 begin redirecting upstream network packets to TOR switch 4A using communication links 16A and 18A, which are included in LAG 42B and LAG 42C, respectively. In this way, ingress interfaces of TOR switch 4B for upstream network packets from servers 12, such as IFC 32B and 32C, stop receiving upstream network packets from servers 12.

In some examples, core switch 8 also implements Link Aggregation Groups, such as shown in FIG. 2. In such examples, TOR switch 4B may use techniques of the disclosure to preemptively notify core switch 8 of the impending NSSU to TOR switch 4B in a similar manner as described with respect to servers 12 in this disclosure. That is, TOR switch 4B may send a LACP message that instructs core switch 8 to stop sending downstream network packets to TOR switch 4B. In response disabling communication link 24 as a communication link in LAG 42A, core switch 8 redirects downstream network packets to TOR switch 4A via communication link 22, which is also included in LAG 42A. In this way, TOR switch 4B may cause downstream network packets to be redirected to TOR switch 4A.

TOR switch 4B may determine that upstream and downstream network packets are no longer received at TOR switch 4B. In response, TOR switch 4B applies the software update, which may include taking TOR switch 4B offline. Once the TOR switch 4B has been updated, TOR switch 4B may come back online. TOR switch 4B, upon coming online, may again begin reprocessing network packets.

Figure 4:
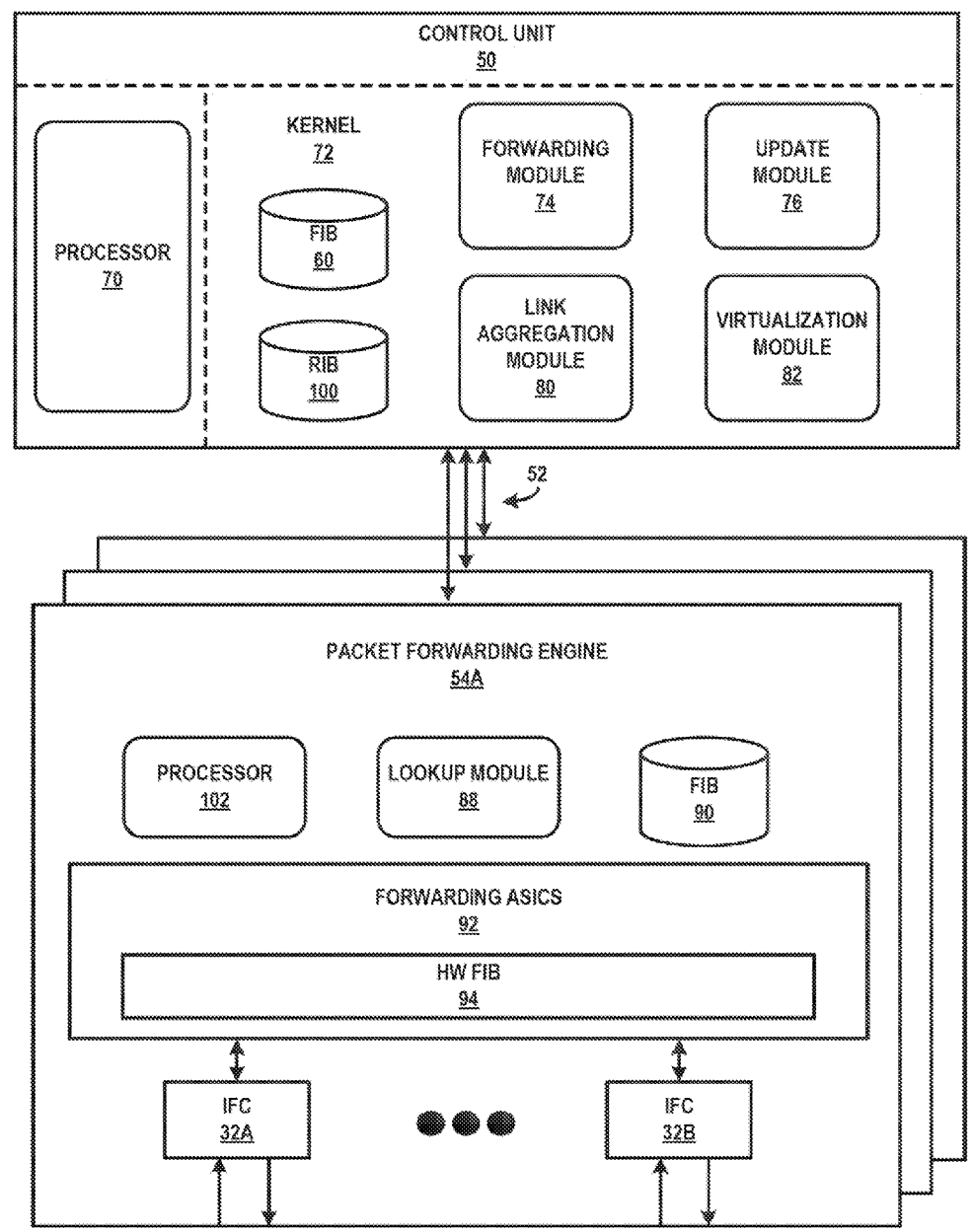
FIG. 4 is a block diagram illustrating in further detail a switch engine and packet-forwarding engines of the TOR switch as shown in FIGS. 1-3, in accordance with techniques of the present disclosure.

FIG. 4 is a block diagram illustrating in further detail one example of control unit 50 and packet-forwarding engine 54A of TOR switch 4B as shown in FIGS. 1-3. In this example, control unit 50 includes a kernel 72 and processor 70. In some examples, kernel 72 includes forwarding module 74, update module 76, link aggregation module 80, virtualization module 82, and forwarding information base 60.

Processor 70 of control unit 50, in some examples, includes a CPU and/or memory and can provide processing resources for one or more components of control unit 50 including forwarding module 74, update module 76, link aggregation module 80, virtualization module 82, forwarding information base (FIB) 60, routing information base (RIB) 100, kernel 72, etc. Processor 70 may execute kernel 72 to provide an operating environment for one or more interfaces between components.

Kernel 72, executing at processor 70, generates and/or maintains forwarding information in the form of FIB 60 based on the network topology that includes TOR switch 4B. In some examples, forwarding information included in FIB 60 is received from TOR switch 4A. For instance, TOR switch 4A may operate as a master controller for virtual switch 6. TOR switch 4A includes a routing engine that uses routing protocols to determine the network topology and various network routes included in example system 2. The routing engine of TOR switch 4A may generate forwarding information based on the various network routes and send the information to TOR switch 4B. TOR switch 4B may store the forwarding information in FIB 60. As further described below in FIG. 4, TOR switch 4B configures PFEs 54 to forward network packets in accordance with FIB 60, such that TOR switch 4B operates as a part of virtual switch 6.

In some examples, control unit 50 optionally includes routing components to perform layer 3 routing such as, routing protocols, a routing information base (RIB) 100, and a routing module. Control unit 50 may include routing components when operating as a master or backup controller to provision and maintain a virtual switch or virtual router that includes multiple, physically separate network resources. When operating as a router, control unit 50 may include various routing protocols, such as Multiprotocol Label Switching (MPLS), Resource Reservation Protocol (RSVP), Border Gateway Protocol (BGP), etc. Routing protocols interact with kernel 72 (e.g., by way of API calls) to update RIB 100 based on routing protocol messages received by control unit 50. For instance, kernel 72, executing at processor 70, generates forwarding information in the form of FIB 60 based on the network topology represented in RIB 100.

In the example of FIG. 4, control unit 50 also includes forwarding module 74. Forwarding module 74 determines forwarding next hops that are included in FIB 60 and configures PFEs 54 to forward network packets using one or more IFCs of PFEs 54. Forwarding module 74 also programs PFEs 54 to install copies of FIB 60 as software FIBs in PFEs 54, such as software FIB 90 included in PFE 54A. As shown in FIG. 4, forwarding module 74 may operate as a routing component. For instance, forwarding module 74 may operate as a backup controller to TOR switch 4A, and therefore forwarding module 74 may include functionality of a routing engine. In such examples, forwarding module 74 uses routing protocols to perform layer 3 routing operations of a routing engine, such as route discovery, route selection, etc. When operating as a routing component, forwarding module 74 may generate and maintain routing information in RIB 100. Forwarding module 74 may generate forwarding information included in FIB 60 based on the routing information included in RIB 100.

As shown in FIG. 4, control unit 50 also includes update module 76. In some examples, update module 76 can apply one or more updates to TOR switch 4B. For example, update module 76 may receive messages that include requests to perform Non-Stop Software Upgrades (NSSU). As further described below, responsive to receiving such messages, update module 76 causes TOR switch 4B to perform controlled NSSU techniques of the present disclosure. Update module 76 may, in some examples, receive update data from another network device that is communicatively coupled to TOR switch 4B. In some examples, update module 76 applies the update data to control unit 50 and/or one or more of PFEs 54.

Control unit 50 also includes virtualization module 82. Virtualization module 82 configures resources of TOR switch 4B to operate as part of virtual switch 6. For example, virtualization module 82 receives forwarding information from TOR switch 4B. Virtualization module 82 may store the forwarding information in FIB 60, which forwarding module 74 may use to configure PFEs 54. In some examples, virtualization module 82 implements one or more virtualization protocols. Using a virtualization protocol, virtualization module 82 sends and receives virtualization control messages with a master controller module, which may reside on a different network device, such as TOR switch 4A. For example, virtualization module 82 may send TOR switch 4A information that specifies how the forwarding plane of TOR switch 4B is configured. Virtualization module 82 may receive virtualization control messages from TOR switch 4A that instruct TOR switch 4B how to configure the forwarding plane of TOR switch 4B. In this way, virtualization module 82 can receive virtualization control messages from a physically remote network device and configure resources of TOR switch 4B as a single, logical virtual switch 6.

In some examples, virtualization module 82 can operate as a master or backup controller for a virtualized system, such as virtual switch 6. When operating as a master controller, virtualization module 82 may receive configuration information from an administrator via a graphical user interface provided by virtualization module 82. In response to receiving the configuration information, virtualization module 82 may send virtualization control message to configure other physical network devices to operate as part of a logical, network device. More generally, when operating as a master controller, virtualization module 82 controls and maintains the logical, network device. When operating as a backup controller, virtualization module 82 operates as a failover controller to a master controller. That is, virtualization module 82, in response to determining that the master controller is unavailable or has gone offline, operates as the master controller until the master that became unavailable is operational again.

Control unit 50 also includes link aggregation module 80. Link aggregation module 80 may use one or more link aggregation protocols, such as Link Aggregation Control Protocol (LACP), to aggregate one or more physical links that operate as a single, logical link. For example, link aggregation module 80 may send and receive LACP packets that configure Link Aggregation Groups (LAGs) at TOR switch 4B and one or more other network devices communicatively coupled to TOR switch 4B.

In the example of FIG. 4, TOR switch 4B is initially configured by virtualization module 82, such that TOR switch 4B operates as part of virtual switch 6. In the current example, TOR switch 4A operates as the master controller for virtual switch 6 and therefore sends forwarding information to TOR switch 4B to configure PFEs 54. Virtualization module 82 stores the forwarding information in FIB 60. Link aggregation module 80 further establishes LAGs 42A, 42B, and 42C as previously described in FIG. 2, with server 12A, server 12B, and core switch 8, respectively.

Initially, FIB 60 includes forwarding information to receive downstream network packets from core switch 8 at IFC 32A as the ingress interface. The forwarding information specifies IFC 32B as the egress interface to send the downstream network packets to server 12A. In the example of FIG. 4, the forwarding information also initially specifies IFC 32B as the ingress interface for upstream network packets received from server 12A that are destined for service provider network 10. In such examples, IFC 34A is initially configured using the forwarding information as the egress interface to forward the upstream network packets to service provider network 10.

Forwarding module 74 sends forwarding information from FIB 60 to PFEs 54, such as PFE 54A, using dedicated link 52. As shown in FIG. 4, PFE 54A includes lookup module 88, software FIB 90, forwarding Application-Specific Integrated Circuits (ASICs) 92, hardware forwarding information base (FIB) 94, and IFCs 32A-32B. Lookup module 88, in some examples, receives forwarding information of FIB 60 from control unit 50 and stores the forwarding information in software FIB 90. Lookup module 88, in some examples, configures hardware FIB 94 of forwarding ASICs 92 to process network packets in accordance with the forwarding information of software FIB 90.

Hardware FIB 94 may include one or more lookup structures. Lookup structures can include associations between network prefixes, network routes, next hops, etc. For instance, an example of a lookup structure may include a radix tree. The radix tree may include hierarchically arranged nodes that correspond to keying information of a network packet, such as a network address, interface identifier, etc. In some examples, a leaf node of the radix tree is associated with a next hop, group of chained next hops, interface identifier, etc. Consequently, when PFE 54A receives a network packet, forwarding ASICS 92 can use keying information (e.g., source network address, destination network address, protocol, source interface, destination) associated with the network packet to traverse the radix tree and select a next hop that corresponds to the keying information. Forwarding ASICs 92 may then process the network packet in accordance with the next hop.

As shown in FIG. 4, PFE 54A includes ASICs 92. ASICs 92 are microcode-controlled chipsets that are programmably configurable by processor 102 in accordance with hardware FIB 94. Specifically, one or more of ASICs 92 are controllable by microcode programmed by processor 102. One example of a network device including a packet processing engine having multiple microcode instruction memories is described in U.S. Pat. No. 6,976,154, the entire contents of which are incorporated herein by reference. Processor 102 programs hardware FIB 94 into internal memory of ASICs 92 based on software FIB 90.

In accordance with techniques of the disclosure to perform a controlled NSSU, control unit 50 initially receives a NSSU request. Update module 76 initially receives the update request. In some examples, the update request includes a network location identifier of update data that is to be applied as part of the NSSU. In such examples, update module 76 may download the update data using the network location identifier. Update module 76 requests that forwarding module 74 determine, using forwarding information of FIB 60, one or more egress interfaces that forward downstream network packets from core switch 8 that are destined to servers 12. In the example of FIG. 4, forwarding module 74 determines that IFCs 32B and 32C are configured in PFEs 54A and 54B to forward the downstream packets to servers 12.

In response to determining that IFCs 32B and 32C are egress interfaces for the downstream network packets, forwarding module 74 sends a request to link aggregation module 80 to remove each of IFCs 32B and 32C from LAGs 42B and 42C as egress interfaces that forward downstream network packets to servers 12. IFC 32B and 32C continue to operate as ingress interfaces for upstream network packets received from servers 12 and destined for service provider network 10.

In response to changing the forwarding path for downstream network packets, forwarding module 74 determines an alternative network route to redirect downstream network packets to servers 12. In some examples, forwarding module 74 selects an alternative network route with the shortest path, e.g., fewest number of hops, to servers 12. In other examples, forwarding module 74 selects an alternative network route that includes a layer 2 communication link from TOR switch 4B to another physical device that is configured to operate as part of virtual switch 6. For example, forwarding module 74 determines that communication link 20 directly couples TOR switch 4B and TOR switch 4A.

In the current example, forwarding module 74 selects a network route using communication link 20 and configures IFC 32D as the egress interface for downstream network packets destined to servers 12. Thus, forwarding module 74 updates the forwarding next hop in FIB 60 to TOR switch 4A and IFC 32D as the next hop interface for downstream network packets. Upon making the updates described above to forwarding information of FIB 60, forwarding module 74 sends forwarding information FIB 60 to PFEs 54, which store the information in software FIBs, such as software FIB 90. PFEs 54 are then configured in accordance with the updated forwarding information of the software FIB.

In accordance with techniques of the disclosure, update module 76 further preemptively notifies servers 12 of the impending software update. In the example of FIG. 4, update module 76 instructs link aggregation module 80 to send requests to servers 12 to stop sending upstream network packets to TOR switch 4B. Link aggregation module 80 generates LACP messages that each includes a sync bit setting. The sync bit setting causes each of servers 12, which support LACP, to place communication links 16B and 18B in standby. Servers 12, in response to receiving the LACP messages, remove the respective communications links and determine alternative routes to redirect upstream network packets to TOR switch 4A. Ingress interfaces of TOR switch 4B for upstream network packets from servers 12, such as IFC 32B and 32C, stop receiving upstream network packets from servers 12.

In some examples, update module 76 may query lookup module 88 for forwarding statistics. Update module 76, upon determining that PFEs 54 are no longer sending and receiving network packets, may apply the software update.

In other examples, update module 76 applies the software update after a period of time has elapsed. For instance, update module 76 may apply the software update after a period of time has elapsed from when link aggregation module 80 sent LACP messages to servers 12. In other examples, update module 76 may apply the software update after a period of time has elapsed from the point in time when forwarding module 74 updated forwarding information of FIB 60 to redirect downstream network packets to TOR switch 4A. Any suitable event may be used as a reference point from which to determine a period of time has elapsed and therefore to apply the software update. That is, TOR switch 4B may determine a first time that is based at least in part on when the first network device received the NSSU request. In response to determining a second time that is subsequent to the first time, TOR switch 4B determines whether a predetermined time period has elapsed between the first time and the second time. The predetermined time period may be a default time period configured at TOR switch 4B or a user-configured time period. If TOR switch 4B determines that the predetermined time period has elapsed between the first time and the second time, TOR switch 4B installs the software update in at least one of the control plane and the data plane of the first network device.

Figure 5:
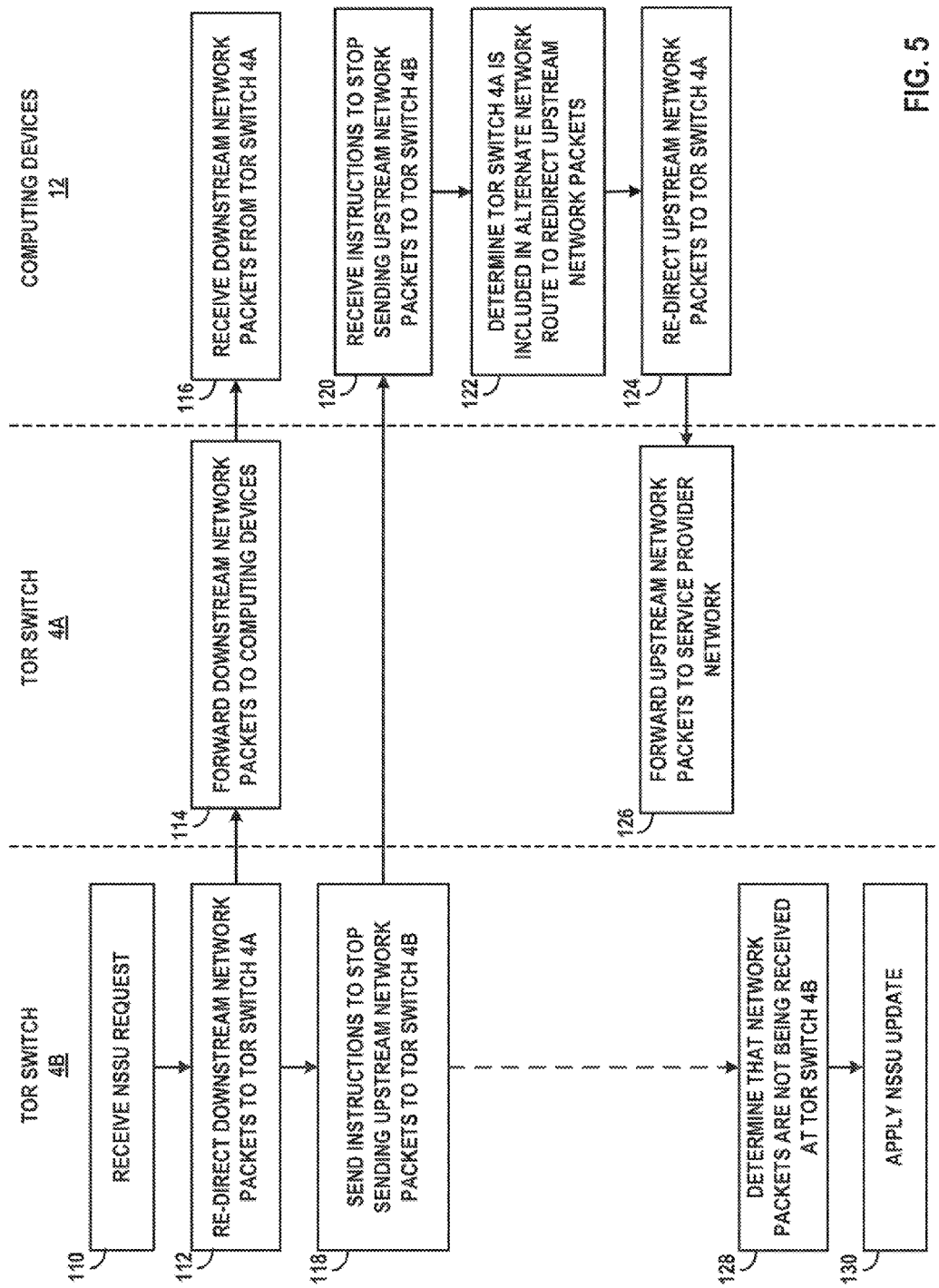
FIG. 5 is a flowchart illustrating example operations to perform a controlled NSSU, in accordance with techniques of this disclosure.

FIG. 5 is a flowchart illustrating example operations to perform a controlled software update, in accordance with techniques of this disclosure. The example of operations may be performed by TOR switch 4A, TOR switch 4B, and servers 12 as described in the examples of FIGS. 1-4. Initially, TOR switch 4B receives a NSSU request to perform an update (110). In response to receiving the NSSU request, TOR switch 4B redirects downstream network packets received core switch 8 and destined to servers 12 to TOR switch 4A (112). For example, TOR switch 4B determines egress interfaces of TOR switch 4B that forward downstream network packets from core switch 8 to servers 12. Upon identifying IFC 32B and 32C, TOR switch 4B removes IFC 32B and 32C from LAG 42B and LAG 42C membership. IFCs 32B and 32C are subsequently not used as egress interfaces by TOR switch 4B to forward downstream network packets to servers 12. TOR switch 4B determines an alternate network route that includes TOR switch 4A and configures IFC 32D as the egress interface for downstream network packets forwarded to TOR switch 4A.

TOR switch 4B forwards the downstream network packets to TOR switch 4A, which in turn forwards the network packets to servers 12 (114). Servers 12 receive the network packets from TOR switch 4A rather than TOR switch 4B following the redirection of downstream network packets by TOR switch 4B (116). TOR switch 4B also sends instructions to servers 12 to stop sending upstream network packets to TOR switch 4B (118). For example, TOR switch 4B sends LACP messages that instruct servers 12 to remove communication link 16B and 18B from membership of LAG 42B and LAG 42C, respectively. Servers 12 receive the messages and remove the respective communication links from membership to the LAGs (120).

Servers 12 determine alternate network routes to redirect the upstream network packets (122). For instance, servers 12, running LACP, determine that LAGs 42B and 42C also include communication links 16A and 18A, respectively. Servers 12 therefore use communication links 16A and 18A to redirect upstream network packets to service provider network 10 using TOR switch 4A (124). TOR switch 4A, upon receiving network packets from servers 12, forwards the network packets to core switch 8 (126).

TOR switch 4B subsequently determines whether network packets are being received at one or more interfaces of TOR switch 4B. TOR switch 4B may determine that network packets are no longer being received at the interfaces of TOR switch 4B (128). For instance, upstream network packets are now sent by servers 12 to TOR switch 4A and forwarded to core switch 8. Similarly, core switch 8 may forward downstream network packets to servers 12 using a network route that includes TOR switch 4A rather than TOR switch 4B. For instance, in examples where core switch 8 also implements LACP or other link aggregation protocol, TOR switch 4B can send a message to core switch 8 to remove communication link 24 from LAG 42A. Core switch 8 may therefore redirect downstream network packets to TOR switch 4A. Once TOR switch 4B determines that packets are no longer being received at its interfaces, TOR switch 4B applies the software update (130).

Figure 6:
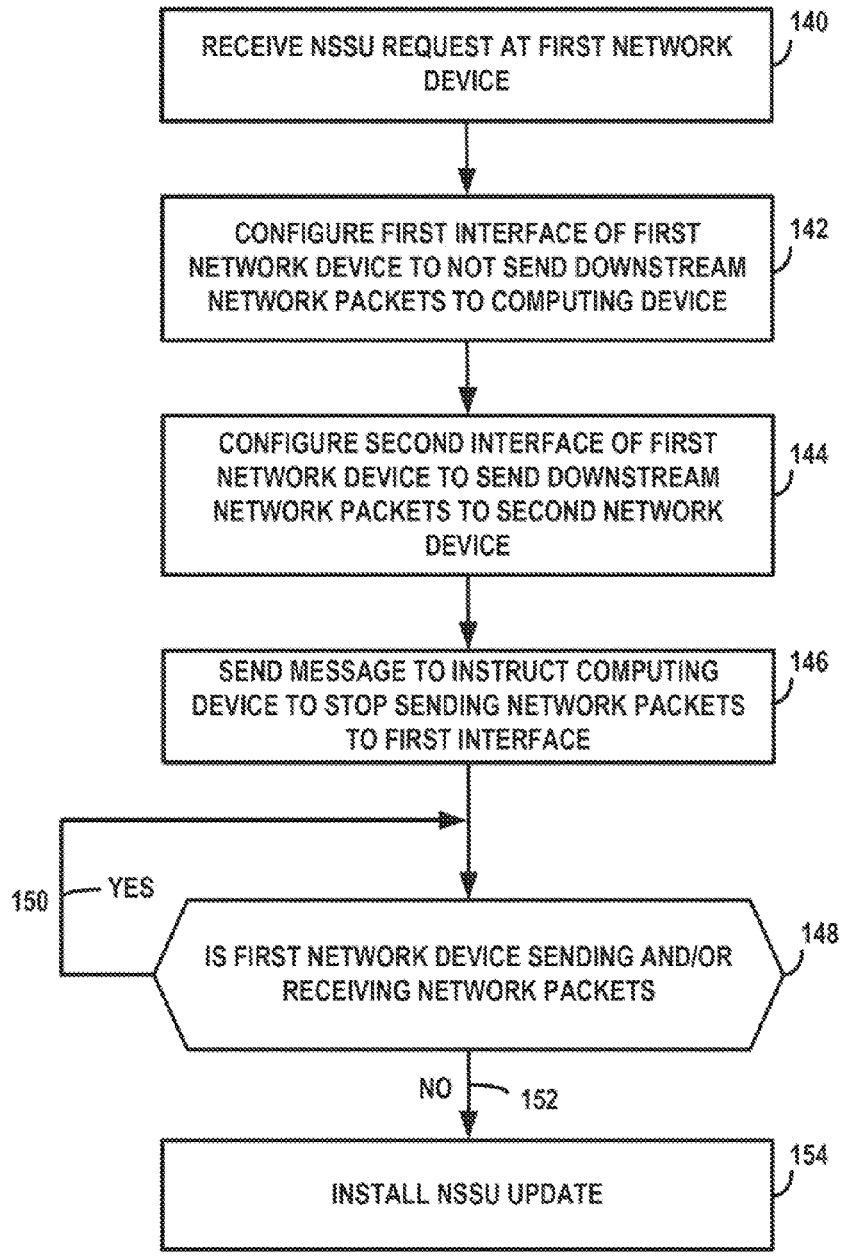
FIG. 6 is a flowchart illustrating example operations to perform a controlled NSSU, in accordance with techniques of this disclosure.

FIG. 6 is a flowchart illustrating example operations to perform a controlled software update, in accordance with techniques of this disclosure. The example of operations may be performed by TOR switch 4B, as described in the examples of FIGS. 1-4. Initially, TOR switch 4B receives a NSSU request (140). In response to receiving the NSSU request, TOR switch 4B configures IFCs 32B and 32C to not send downstream network packets to servers 12 (142). For instance, TOR switch 4B removes IFC 32C from LAG 42C and IFC 32B from LAG 42B, such that IFCs 32B and 32C are configured to receive upstream network packets from servers 12 but do not send downstream network packets received from service provider network 10 to servers 12.

TOR switch 4B further configures IFC 32D as the egress interface to forward downstream network packets from core switch 8 to TOR switch 4A (144). The downstream network packets, in the example of FIG. 6 are destined for server 12. In this way, TOR switch 4B redirects downstream network packets to TOR switch 4A. TOR switch 4A, in turn, forwards the downstream network packets to servers 12. In the example of FIG. 6, TOR switch 4B sends messages to servers 12 that instruct servers 12 to stop sending upstream network packets to IFCs 32B and 32C (146). For instance, TOR switch 4B sends LACP messages to servers 12 that instruct servers 12 to disable IFCs 32B and 32C from sending upstream network packets to TOR switch 4B. In response to processing the messages, servers 12 determine alternate network routes that include TOR switch 4A to forward the upstream network packets to service provider network 10.

In the example of FIG. 6, TOR switch 4B determines whether it is sending or receiving network packets at any of its interfaces to or from servers 12, core switch 8 and TOR switch 4A. If TOR switch 4B determines that it is sending or receiving network packets at any of its interfaces (148), TOR switch 4B may subsequently check again at a later time whether it is sending or receiving the network packets (150). If TOR switch 4B determines that it is not sending or receiving network packets at any of its interfaces (152), TOR switch 4B installs the software update (154). In some examples, the software update is applied to update at least one of the control plane or the forwarding plane of TOR switch 4B.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EE-PROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

The invention claimed is:

1. A method comprising:
receiving, by a first network device included in a virtual network device, a non-stop software upgrade (NSSU) request, wherein the first network device is communicatively coupled to each of a computing device and a second network device in the virtual network device, wherein the computing device is multi-homed to the first network device by a first communication link and the second network device by a second communication link, the first and second communication links included in a multi-link aggregation group using a multi-link protocol;
in response to receiving the NSSU request, forwarding, by the first network device and to the second network device, network packets that are received at the first network device and destined to the computing device;
sending, by the first network device using the multi-link protocol, a link-aggregation message to the computing device that instructs the computing device to stop sending network packets to the first network device using the first communication link, such that the computing device redirects network packets to the second network device using the second communication link in the multi-link aggregation group before one or more software components within the first network device are updated; and
after sending the link-aggregation message to the computing device, updating the one or more software components within the first network device based at least in part on the NSSU request.

2. The method of claim 1, further comprising:
determining, by the first network device, the first communication link that communicatively couples the first network device to the computing device, wherein the first communication link is configured in the multi-link aggregation group that is configured by the first network device; and
generating, by the first network, the link aggregation message to instruct the computing device to stop using the first communication link to send network packets to the first network device.

3. The method of claim 1, wherein updating one or more software components within the first network device based at least in part on the NSSU request, further comprises:
determining, by the first network device, whether any of a plurality of interfaces included in the first network device are at least sending or receiving network packets; and
in response to determining that none of the plurality of interfaces are sending or receiving network packets, installing in at least one of a control plane and a forwarding plane of the first network device the software update.

4. The method of claim 1, wherein installing in the control plane of the first network device a software update based at least in part on the NSSU request, further comprises:
- determining, by the first network device, a first time that is based at least in part on when the first network device received the NSSU request; and
- in response to determining at a second time that a predetermined time period has elapsed between the first time and the second time, installing in at least one of the control plane and the forwarding plane of the first network device the NSSU.

5. The method of claim 2, wherein the link aggregation message is a Link Aggregation Control Protocol message that comprises a setting to disable the first communication link from being used in the multi-link aggregation group by the computing device to send network packets from the computing device to the first network device.

6. The method of claim 2, further comprising:
- determining, by the first network device, a network route that does not include the first communication link to forward network packets that are received at the first network and destined to the computing device, wherein the network route includes the second network device; and
- updating, by the first network device, at least one of a forwarding plane and a control plane of the first network device to forward to the second network device, network packets that are received at the first network device and destined to the computing device.

7. The method of claim 2, further comprising:
- determining, by the first network device, an interface of the first network device that is operatively coupled to the first communication link that is configured in the multi-link aggregation group,
- wherein the interface is configured to receive network packets at the first network device from the computing device that are destined to a third network device, and
- wherein the interface is configured to send network packets received at the first network device that are from the third network device and destined to the computing device; and
- configuring, by the first network device, the interface not to send network packets received from the third network device to the computing device.

8. The method of claim 7, wherein the interface is a first interface, the method further comprising:
- determining, by the first network device, a second interface of the first network device that is operatively coupled to a third communication link, wherein the third communication link communicatively couples the first network device and the second network device; and
- configuring, by the first network device, the second interface to send to the second network device, network packets received at the first network device that are from the third network device and destined to the computing device.

9. The method of claim 7, wherein configuring the interface not to send network packets received from the third network device to the computing device, further comprises:
- removing, by the first network device, the interface from the multi-link aggregation group configured by the first network device, wherein the interface receives network packets from the computing device, and wherein the interface does not send network packets to the computing device.

10. The method of claim 2, wherein the multi-link aggregation group is a first multi-link aggregation group and wherein the computing device is a first computing device, the method further comprising:
- determining, by the first network device, a third communication link that communicatively couples the first network device to a second computing device, wherein the third communication link is configured in a second multi-link aggregation group that is configured by the first network device; and
- sending, by the first network device and to the second computing device, a link aggregation message to instruct the second computing device to stop sending network packets to the first network device.

11. The method of claim 10, further comprising:
- determining, by the first network device, an interface of the first network device that is operatively coupled to the third communication link that is configured in the second multi-link aggregation group,
- wherein the interface is configured to receive network packets at the first network device from the second computing device that are destined to the first computing device, and
- wherein the interface is configured to send network packets received at the first network device that are from first computing device and destined to the second computing device; and
- configuring, by the first network device, the interface not to send network packets received from the first computing device to the second computing device.

12. The method of claim 11, wherein configuring the interface not to send network packets received from the first computing device to the second computing device, further comprises:
- removing, by the first network device, the interface from the second multi-link aggregation group configured by the first network device, wherein the interface receives network packets from the first computing device, and wherein the interface does not send network packets to the second computing device.

13. A network device comprising:
- an interface that receives a non-stop software upgrade (NSSU) request, wherein the network device is a first network device included in a virtual network device, wherein the first network device is communicatively coupled to each of a computing device and a second network device in the virtual network device, wherein the computing device is multi-homed to the first network device by a first communication link and the second network device by a second communication link, the first and second communication links included in a multi-link aggregation group using a multi-link protocol;
- a forwarding unit that, in response to receiving the NSSU request, forwards, by the first network device and to the second network device, network packets that are received at the first network device and destined to the computing device;
- wherein the forwarding unit sends, by the first network device using the multi-link protocol, a link-aggregation message to the computing device that instructs the computing device to stop sending network packets to the first network device using the first communication link, such that the computing device redirects network packets to the second network device using the second communication link in the multi-link aggregation group before one or more software components within the first network device are updated; and an update module that, after sending the link-aggregation message to the computing device, updates one or more software components within the first network device based at least in part on the NSSU request.

14. The network device of claim 13, further comprising:
a link aggregation module that determines the first communication link that communicatively couples the first network device to the computing device, wherein the first communication link is configured in the multi-link aggregation group that is configured by the first network device; and
wherein the link aggregation module generates the link aggregation message to instruct the computing device to stop using the first communication link to send network packets to the first network device.

15. The network device of claim 13,
wherein the forwarding unit determines whether any of a plurality of interfaces included in the first network device are at least sending or receiving network packets; and
wherein the update module, in response to determining that none of the plurality of interfaces are sending or receiving network packets, installs in at least one of a control plane and a forwarding plane of the first network device the software update.

16. The network device of claim 13,
wherein the update module determines a first time that is based at least in part on when the first network device received the NSSU request; and
wherein, in response to determining at a second time that a predetermined time period has elapsed between the first time and the second time, the update module installs in at least one of the control plane and the forwarding plane of the first network device the NSSU.

17. The network device of claim 14, wherein the link aggregation message is a Link Aggregation Control Protocol message that comprises a setting to disable the first communication link from being used in the multi-link aggregation group by the computing device to send network packets from the computing device to the first network device.

18. The network device of claim 14,
a control unit that determines a network route that does not include the first communication link to forward network packets that are received at the first network and destined to the computing device, wherein the network route includes the second network device; and
wherein the update module updates at least one of a forwarding plane and a control plane of the first network device to forward to the second network device, network packets that are received at the first network device and destined to the computing device.

19. The network device of claim 14,
wherein the forwarding unit determines an interface of the first network device that is operatively coupled to the first communication link that is configured in the multi-link aggregation group;
wherein the forwarding unit configures the interface to receive network packets at the first network device from the computing device that are destined to a third network device;
wherein the forwarding unit configures the interface to send network packets received at the first network device that are from the third network device and destined to the computing device; and wherein the forwarding unit configures the interface not to send network packets received from the third network device to the computing device.

20. The network device of claim 19,
wherein the interface is a first interface;
wherein the forwarding unit determines a second interface of the first network device that is operatively coupled to a second communication link, wherein the third communication link communicatively couples the first network device and the third network device; and
wherein the forwarding unit configures the second interface to send to the second network device, network packets received at the first network device that are from the third network device and destined to the computing device.

21. The network device of claim 19,
wherein configuring the interface not to send network packets received from the third network device to the computing device;
wherein the link aggregation module removes the interface from the multi-link aggregation group configured by the first network device, wherein the interface receives network packets from the computing device, and wherein the interface does not send network packets to the computing device.

22. The network device of claim 14,
wherein the multi-link aggregation group is a first multi-link aggregation group and wherein the computing device is a first computing device;
wherein the link aggregation module determines a third communication link that communicatively couples the first network device to a second computing device, wherein the third communication link is configured in a second multi-link aggregation group that is configured by the first network device; and
wherein the forwarding unit sends, to the second computing device, a link aggregation message to instruct the second computing device to stop sending network packets to the first network device.

23. The network device of claim 22,
wherein the link aggregation module determines an interface of the first network device that is operatively coupled to the third communication link that is configured in the second multi-link aggregation group;
wherein the forwarding unit configures the interface to receive network packets at the first network device from the second computing device that are destined to the first computing device, and
the forwarding unit configures the interface to send network packets received at the first network device that are from first computing device and destined to the second computing device; and
wherein the forwarding unit configures the interface not to send network packets received from the first computing device to the second computing device.

24. The network device of claim 23,
wherein the link aggregation module removes the interface from the second multi-link aggregation group configured by the first network device, wherein the interface receives network packets from the first computing device, and wherein the interface does not send network packets to the second computing device.

25. A non-transitory computer-readable storage medium comprising instructions for causing a programmable processor of a network device to:
receive a non-stop software upgrade (NSSU) request, wherein the network device is a first network device included in a virtual network device, wherein the first network device is communicatively coupled to each of a computing device and a second network device in the virtual network device, wherein the computing device is multi-homed to the first network device by a first communication link and the second network device by a second communication link, the first and second communication links included in a multi-link aggregation group using a multi-link protocol;

forward, in response to receiving the NSSU request and to the second network device, network packets that are received at the first network device and destined to the computing device;

send a link-aggregation message to the computing device that instructs the computing device to stop sending network packets to the first network device using the first communication link, such that the computing device redirects network packets to the second network device using the second communication link in the multi-link aggregation group before one or more software components within the first network device are updated; and update, after sending the link-aggregation message to the computing device, one or more software components within the first network device based at least in part on the NSSU request.

26. A data center comprising:

a plurality of servers; and a virtual network device that includes a first network device and a second network device that each provide multi-homed access to the plurality of servers in accordance with a link aggregation protocol, wherein at least one of the plurality of servers is multi-homed to the first network device by a first communication link and the second network device by a second communication link, the first and second communication links included in a multi-link aggregation group using a multi-link protocol, wherein the first network device comprises a control unit that, in response to receiving a non-stop software upgrade (NSSU) request, redirects network packets to the second network device that are received at the first network device and destined to the plurality of servers that includes the at least one server, and sends link-aggregation messages to the plurality of computing devices using the link aggregation protocol to instruct each of the plurality of computing devices to stop sending network packets to the first network device, such that the plurality of network devices redirect network packets to the second network device before one or more software components within the first network device are updated, and wherein, after sending the link-aggregation messages to the computing devices, the control unit updates one or more software components within the first network device based at least in part on the NSSU request.

\* \* \* \* \*